United States Patent
Park et al.

(10) Patent No.: US 10,989,854 B2
(45) Date of Patent: Apr. 27, 2021

(54) POLARIZATION CONVERSION ELEMENT AND OPTICAL ISOLATION DEVICE

(71) Applicant: LG Chem, Ltd., Seoul (KR)

(72) Inventors: Seong Min Park, Daejeon (KR); Sang Choll Han, Daejeon (KR); Min Soo Song, Daejeon (KR)

(73) Assignee: LG Chem, Ltd.

( * ) Notice: Subject to any disclaimer, the term of this patent is extended or adjusted under 35 U.S.C. 154(b) by 160 days.

(21) Appl. No.: 16/340,558

(22) PCT Filed: Oct. 13, 2017

(86) PCT No.: PCT/KR2017/011315
§ 371 (c)(1),
(2) Date: Apr. 9, 2019

(87) PCT Pub. No.: WO2018/070828
PCT Pub. Date: Apr. 19, 2018

(65) Prior Publication Data
US 2019/0257994 A1     Aug. 22, 2019

(30) Foreign Application Priority Data

Oct. 13, 2016  (KR) ................... 10-2016-0132842

(51) Int. Cl.
*G02B 5/32*     (2006.01)
*G02B 5/30*     (2006.01)
(Continued)

(52) U.S. Cl.
CPC ................. *G02B 5/32* (2013.01); *G02B 5/30* (2013.01); *G02B 5/3025* (2013.01);
(Continued)

(58) Field of Classification Search
CPC ...... G02B 5/32; G02B 6/2746; G02B 5/3025; G02B 27/286
See application file for complete search history.

(56) References Cited

U.S. PATENT DOCUMENTS

| 5,745,266 A | 4/1998 | Smith |
| 2003/0067760 A1 | 4/2003 | Jagt et al. |

(Continued)

FOREIGN PATENT DOCUMENTS

| CN | 1559000 A | 12/2004 |
| CN | 1922531 A | 2/2007 |

(Continued)

OTHER PUBLICATIONS

Search report from International Application No. PCT/KR2017/011315, dated Jan. 11, 2018.

(Continued)

*Primary Examiner* — Cara E Rakowski
(74) *Attorney, Agent, or Firm* — Lerner, David, Littenberg, Krumholz & Mentlik, LLP

(57) ABSTRACT

The present application relates to a polarization conversion element and an optical isolation device. The present application provides a polarization conversion element capable of converting unpolarized incident light into one polarized light and an optical isolation device with an excellent optical isolation ratio comprising the polarization conversion element. Such an optical isolation device can be applied to various applications such as the field of optical communication or laser optics, the field of security or privacy protection, brightness enhancement of displays, or a use for hiding and covering.

14 Claims, 2 Drawing Sheets

(51) Int. Cl.
*G02B 27/28* (2006.01)
*G02F 1/1335* (2006.01)
*G02B 6/27* (2006.01)

(52) U.S. Cl.
CPC ......... *G02B 6/2706* (2013.01); *G02B 6/2746* (2013.01); *G02B 27/28* (2013.01); *G02B 27/286* (2013.01); *G02F 1/1335* (2013.01)

(56) References Cited

U.S. PATENT DOCUMENTS

| | | | |
|---|---|---|---|
| 2007/0177264 A1 | 8/2007 | Konno et al. | |
| 2012/0200831 A1 | 8/2012 | Tominaga | |
| 2016/0011353 A1* | 1/2016 | Escuti | G02B 5/3083 359/15 |

FOREIGN PATENT DOCUMENTS

| | | |
|---|---|---|
| CN | 102687046 A | 9/2012 |
| JP | S62146443 A | 6/1987 |
| JP | H09146064 A | 6/1997 |
| JP | 200223107 A | 1/2002 |
| JP | 200240254 A | 2/2002 |
| JP | 2003167124 A | 6/2003 |
| JP | 2003167127 A | 6/2003 |
| JP | 2005504413 A | 2/2005 |
| JP | 2006236804 A | 9/2006 |
| JP | 2006243675 A | 9/2006 |
| JP | 2007225905 A | 9/2007 |
| JP | 2007322832 A | 12/2007 |
| JP | 2008090052 A | 4/2008 |
| JP | 2009211873 A | 9/2009 |
| JP | 2010224520 A | 10/2010 |
| JP | 2014010241 A | 1/2014 |
| JP | 2016138966 A | 8/2016 |
| KR | 20000050976 A | 8/2000 |
| WO | 03027569 A1 | 4/2003 |
| WO | 2011043208 A1 | 4/2011 |

OTHER PUBLICATIONS

Extended European Search Report including the Written Opinion for Application No. 17861084.6 dated Oct. 4, 2019, 8 pages.
Chinese Search Report for Application No. 201780062606.X, dated Sep. 30, 2020, pp. 1-2.

* cited by examiner

[Figure 1]
Prior Art
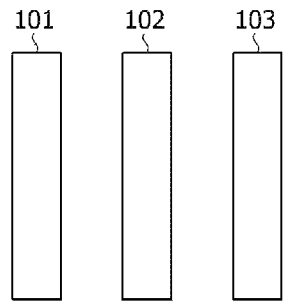
[Figure 2]
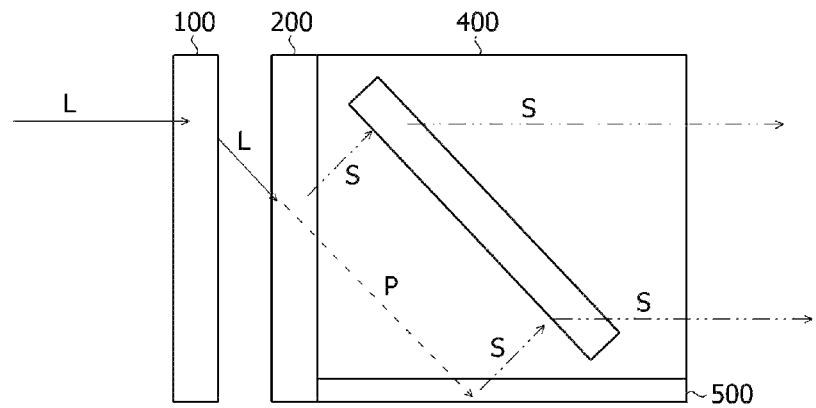
[Figure 3]
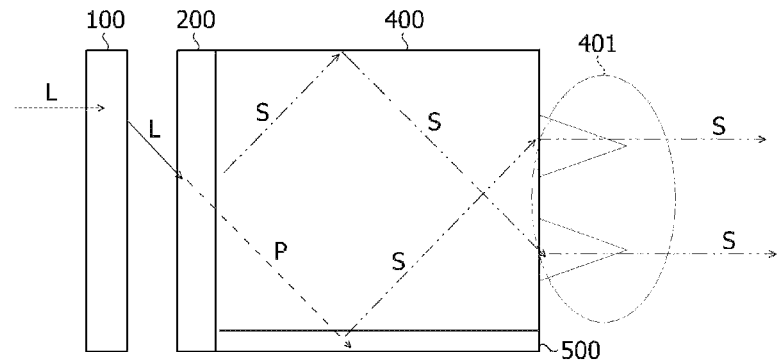

[Figure 4]
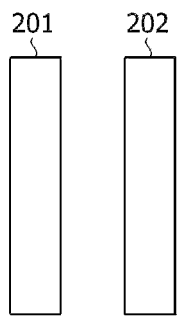
[Figure 5]
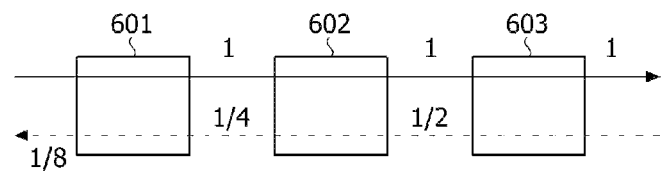

POLARIZATION CONVERSION ELEMENT AND OPTICAL ISOLATION DEVICE

CROSS-REFERENCE TO RELATED APPLICATIONS

The present application is a national phase entry under 37 U.S.C. § 371 of International Application No. PCT/KR2017/011315 filed on Oct. 13, 2017, which claims priority from Korean Patent Application No. 10-2016-0132842 filed on Oct. 13, 2016, all of which are incorporated hereby by reference.

TECHNICAL FIELD

The present application relates to a polarization conversion element and an optical isolation device.

BACKGROUND ART

The optical isolation device is a device in which a forward light transmittance is higher than a backward light transmittance, which is also called an optical diode. The optical isolation device can be used to prevent unnecessary reflected light in the field of optical communication or laser optics, or it can also be applied to a building or automobile glass to be used for security or privacy protection, and the like. The optical isolation device can also be applied to applications such as brightness enhancement in various displays or military products for hiding and covering.

As the optical isolation device, there is a Faraday optical isolator using Faraday effect. The principle of the Faraday optical isolator is shown in FIG. 1. The Faraday optical isolator comprises a first polarizer (101), a Faraday rotator (102) and a second polarizer (103), where the absorption axes of the first and second polarizers (101, 103) are disposed to form 45 degrees with each other. The Faraday rotator rotates incident light linearly polarized by passing through the first polarizer by 45 degrees, whereby the incident light is transmitted through the second polarizer (forward direction). On the contrary, if the linearly polarized light transmitted through the second polarizer is equally rotated 45 degrees by the Faraday rotator, it becomes linearly polarized light (P)arallel to the absorption axis of the first polarizer, so that it cannot be transmitted through the first polarizer (backward direction).

Since the Faraday optical isolator requires a very large external magnetic field for driving and an expensive material has to be applied thereto, it is difficult to make it large in size.

DISCLOSURE

Technical Problem

The present application relates to a polarization conversion element and an optical isolation device.

Technical Solution

In the present application, the term polarization conversion element means an element configured such that it can convert unpolarized incident light into one polarized light and exit it.

In one example, the polarization conversion element may have a transmittance of 10% or more, 15% or more, 20% or more, 25% or more, 30% or more, 35% or more, 40% or more, 45% or more, 50% or more, 55% or more, 60% or more, 65% or more, 70% or more, 75% or more, 80% or more, 85% or more, 90% or more, or 95% or more. The upper limit of the transmittance is not particularly limited and may be about 100%. The transmittance may be a ratio of the one polarized light transmitted through the polarization conversion element relative to unpolarized light incident on the polarization conversion element. That is, ideally, it is preferred that the polarization conversion element is configured so as to be capable of converting the incident unpolarized light into one polarized light without loss.

In this specification, the reference wavelength of optical properties such as the terms transmittance, retardation value, reflectance and refractive index can be determined according to light to be isolated with the optical isolation device and/or unpolarized light to be converted. That is, in one example, the reference wavelength may be the wavelength of the light to be isolated and/or the wavelength of the unpolarized light to be converted. For example, when the optical isolation device is intended to isolate light in the visible light region, the reference wavelength of the transmittance or the like may be, for example, a value based on light having any wavelength within the range of 400 nm to 700 nm or about 550 nm; in the case of being intended to isolate light in the infrared region, the transmittance or the like may be determined based on light having a wavelength of about 1,000 nm; and in the case of being intended to isolate light in the ultraviolet region, the transmittance or the like may be determined based on light having a wavelength of about 250 nm.

The light transmitted through the polarization conversion element may substantially comprise only one polarized light. For example, 60% or more, 65% or more, 70% or more, 75% or more, 80% or more, 85% or more, 90% or more or 95% or more of the light transmitted through the polarization conversion element may be one polarized light. Ideally, 100% of the light transmitted through the polarization conversion element may be only the one polarized light.

The polarization conversion element according to one aspect may comprise at least a first holographic optical element, a second holographic optical element and a waveguide medium.

Each of the first and second holographic optical elements and the waveguide medium has a light exit surface and a light entrance surface. In the polarization conversion element, the first holographic optical element, the second holographic optical element and the waveguide medium may be disposed in this order. Here, the arrangement of the first holographic optical element, the second holographic optical element and the waveguide medium in the above order may mean that the light exit surface of the first holographic optical element and the light entrance surface of the second holographic optical element are opposed to each other, and the light exit surface of the second holographic optical element and the light entrance surface of the waveguide medium are opposed to each other.

In the present application, the term incident angle is an angle measured based on a normal of a light entrance surface, unless otherwise specified, where the angle measured in the clockwise direction based on the normal is represented by a positive number and the angle measured in the counterclockwise direction is represented by a negative number. Furthermore, in the present application, the term output angle is an angle measured based on a normal of a light exit surface, unless otherwise specified, where the angle measured in the clockwise direction based on the normal is represented by a positive number and the angle measured in the counterclockwise direction is represented by a negative number.

The first holographic optical element may be an element capable of exiting light incident at an incident angle, which is a first angle, to an output angle, which is a second angle. Here, the first angle may be an angle of greater than −90 degrees and less than 90 degrees. The first angle may be −80 degrees or more, −70 degrees or more, −60 degrees or more, −50 degrees or more, −40 degrees or more, −30 degrees or more, −20 degrees or more, −10 degrees or more, or −5 degrees or more, and the first angle may be 80 degrees or less, 70 degrees or less, 60 degrees or less, 50 degrees or less, 40 degrees or less, 30 degrees or less, 20 degrees or less, 10 degrees or less, or 5 degrees or less, and may be substantially 0 degrees.

Furthermore, the second angle may be greater than 0 degrees and less than 90 degrees. In another example, the second angle may be 5 degrees or more, 10 degrees or more, 15 degrees or more, 20 degrees or more, 25 degrees or more, 30 degrees or more, or 40 degrees or more, or may be 85 degrees or less, 80 degrees or less, 75 degrees or less, 70 degrees or less, 65 degrees or less, 60 degrees or less, 55 degrees or less, or 50 degrees or less. The second angle may be substantially about 45 degrees. In another example, the second angle may be greater than −90 degrees and less than 0 degrees. In another example, the second angle may be −5 degrees or more, −10 degrees or more, −15 degrees or more, −20 degrees or more, −25 degrees or more, −30 degrees or more, or −40 degrees or more, or may be −85 degrees or more, −80 degrees or more, −75 degrees or more, −70 degrees or more, −65 degrees or more, −60 degrees or more, −55 degrees or more, or −50 degrees or more. The second angle may be substantially about −45 degrees.

The light that is incident on the first holographic optical element and then refracted and exited may be unpolarized light. Therefore, theoretically, the light exited after being incident on the first holographic optical element may be comprised of an orthogonal mode pair of polarized lights. Here, the orthogonal mode pair is comprised of two linearly polarized lights whose polarization directions are perpendicular to each other or two circularly polarized lights whose rotation directions are opposite to each other. As used herein, the term vertical, horizontal, parallel or orthogonal may mean substantially vertical, horizontal, parallel or orthogonal, taking into account an error, where the error, for example, within ±10 degrees, within ±8 degrees, within ±6 degrees, within ±4 degrees, within ±2 degrees, within ±1 degree, or within ±0.5 degrees may exist. In addition, the term circularly polarized light herein is a concept including also so-called elliptically polarized light. Hereinafter, in this specification, for convenience, any one polarized light among the orthogonal mode pair may be referred to as a first polarized light and the other polarized light may be referred to as a second polarized light.

The second polarized light is an element that among the orthogonal mode pair of unpolarized light incident at an incident angle of a third angle, the first polarized light is exited to an output angle of a fourth angle and the second polarized light is exited to an output angle of a fifth angle.

Here, the third angle, the fourth angle and the fifth angle may be more than 0 degrees and less than 90 degrees. In another example, the third angle, the fourth angle and the fifth angle may be 5 degrees or more, 10 degrees or more, 15 degrees or more, 20 degrees or more, 25 degrees or more, 30 degrees or more, or 40 degrees or more, or may be 85 degrees or less, 80 degrees or less, 75 degrees or less, 70 degrees or less, 65 degrees or less, 60 degrees or less, 55 degrees or less, or 50 degrees or less. The third angle, the fourth angle and the fifth angle may be substantially about 45 degrees. In another example, the third angle, the fourth angle and the fifth angle may be greater than −90 degrees and less than 0 degrees. In another example, the third angle, the fourth angle and the fifth angle may be −5 degrees or more, −10 degrees or more, −15 degrees or more, −20 degrees or more, −25 degrees or more, −30 degrees or more, or −40 degrees or more, or may be −85 degrees or more, −80 degrees or more, −75 degrees or more, −70 degrees or more, −65 degrees or more, −60 degrees or more, −55 degrees or more, or −50 degrees or more. The third angle, the fourth angle and the fifth angle may be substantially about −45 degrees.

In the polarization conversion element, the first and second holographic optical elements are disposed such that the light exited from the first holographic optical element is incident on the second holographic optical element, where the second angle, which is an output angle of the first holographic optical element, and the third angle, which is an incident angle of the second holographic optical element, may be in a range of about 80 degrees to 100 degrees, for example, substantially about 90 degrees, or in a range of −100 degrees to −80 degrees or about −90 degrees, in total of the third and second angles.

Also, the sum of the fourth angle and the fifth angle may be in a range of about −10 degrees to about 10 degrees, in a range of about −5 degrees to about 5 degrees, or substantially 0 degrees.

The polarization conversion element according to a first aspect comprises a waveguide medium together with the first and second holographic optical elements, wherein the waveguide medium is disposed at a position where the first and second polarized lights incident on the light exit surface of the second holographic optical element can be incident on the light entrance surface of the waveguide medium. The waveguide medium is an element that the light incident on the light entrance surface can be totally reflected from the inside, guided to the light exit surface and exited. In the present application, as the waveguide medium, various known wave directors may be used, and for example, a prism having a refractive index in a range of about 1.45 to 1.65 or the like may be used. In the present application, the refractive index is a value measured based on a wavelength of about 550 nm.

The wave director comprises sidewalls. The sidewall may be formed at an angle in a range of 80 degrees to 100 degrees with the light entrance surface and/or the light exit surface of the waveguide medium. In another example, the angle may be about 85 degrees or more, about 95 degrees or less, or about 90 degrees or so. In one example, the sidewall may be present at a position where the second polarized light exited to the output angle of the fifth angle can be incident on the sidewall. The second polarized light incident on the sidewall may be totally reflected from the sidewall.

A retarder may be formed on the sidewall. As the retarder, a λ/2 plate or a λ/4 plate may be applied. The term λ/2 plate is a retarder referred to as a so-called HWP (half wave plate), which is an element that when linearly polarized light is incident, the polarization direction of the linearly polarized light can be rotated by approximate 90 degrees, and the term λ/4 plate is a retarder referred to as a so-called QWP (quarter wave plate), which is an element capable of converting linearly polarized light and circularly polarized light to each other. Retarders that can act as the λ/2 plate or λ/4 plate are variously known in this field. For example, the retarder may be a polymer stretched film or a liquid crystal polymer film. As the polymer stretched film, for example, an acrylic film, a polyolefin film such as a polyethylene film or a polypropylene film, a cycloolefin polymer (COP) film such as a polynorbornene film, a polyvinyl chloride film, a polyacrylonitrile film, a polysulfone film, a polyvinyl alcohol film or a cellulose ester polymer film such as a TAC (triacetyl cellulose) film, or a copolymer film of two or more monomers among monomers forming the polymer, and the like may be exemplified. The retarder may be formed by appropriately stretching such a film by a method known in this field. In addition, as the liquid crystal polymer film, a film obtained by orienting and polymerizing a known liquid crystal film such as a nematic liquid crystal or a discotic liquid crystal may be exemplified.

Retarders that can act as the $\lambda/2$ plate or $\lambda/4$ plate in this field are known and such films may be used without limitation in the present application.

In the present application, the shape of the waveguide medium as above is not particularly limited as long as the medium has the light entrance surface, the light exit surface and the sidewalls, and the retarder is formed on at least a part of the sidewall.

However, the shape of the waveguide medium needs to be formed such that the first polarized light exited from the second holographic optical element at the fourth angle at least cannot enter or can enter the sidewall, on which the retarder is formed, even times, and the second polarized light exited from the second holographic optical element at the fifth angle can be incident on the sidewall, on which the retarder is formed, at least once or odd times. The adjustment method as above is known, which can be achieved, for example, by adjusting the length of the waveguide medium in consideration of the incident angle of the light incident on the waveguide medium.

The polarization conversion element according to one aspect of the present application may further comprise a third holographic optical element in the waveguide medium. The third holographic optical element may also have a light entrance surface and a light exit surface. Here, the third holographic optical element may be an element capable of exiting the light incident at the incident angle, which is a sixth angle, to the output angle, which is a seventh angle. Here, the sixth angle may be an angle of greater than −90 degrees and less than 90 degrees. The sixth angle may be −80 degrees or more, −70 degrees or more, −60 degrees or more, −50 degrees or more, −40 degrees or more, −30 degrees or more, −20 degrees or more, −10 degrees or more, or −5 degrees or more, and the sixth angle may be 80 degrees or less, 70 degrees or less, 60 degrees or less, 50 degrees or less, 40 degrees or less, 30 degrees or less, 20 degrees or less, 10 degrees or less, or 5 degrees or less, and may be substantially 0 degrees.

Furthermore, the seventh angle may be greater than 0 degrees and less than 90 degrees. In another example, the seventh angle may be 5 degrees or more, 10 degrees or more, 15 degrees or more, 20 degrees or more, 25 degrees or more, 30 degrees or more, or 40 degrees or more, or may be 85 degrees or less, 80 degrees or less, 75 degrees or less, 70 degrees or less, 65 degrees or less, 60 degrees or less, 55 degrees or less, or 50 degrees or less. The seventh angle may be substantially about 45 degrees. In another example, the seventh angle may be greater than −90 degrees and less than 0 degrees. In another example, the seventh angle may be −5 degrees or more, −10 degrees or more, −15 degrees or more, −20 degrees or more, −25 degrees or more, −30 degrees or more, or −40 degrees or more, or may be −85 degrees or more, −80 degrees or more, −75 degrees or more, −70 degrees or more, −65 degrees or more, −60 degrees or more, −55 degrees or more, or −50 degrees or more. The seventh angle may be substantially about −45 degrees.

Here, the sum of the seventh angle and the second angle which is the output angle of the first holographic optical element may be in the range of about −10 degrees to about 10 degrees, in the range of about −5 degrees to about 5 degrees, or substantially 0 degrees. In another example, the sum may be an angle in the range of about 80 degrees to about 100 degrees. In another example, the sum may be about 85 degrees or more, about 95 degrees or less, or about 90 degrees or so.

The third holographic optical element may be present at a position where the first polarized light not incident on the sidewall, on which the retarder is formed, or the first polarized light incident on the sidewall, on which the retarder is formed, even times, can be incident on the third holographic optical element at an incident angle corresponding to the sixth angle, in the waveguide medium. In addition, the third holographic optical element may be present at a position where the second polarized light incident on the sidewall, on which the retarder is formed, odd times, can be incident on the third holographic optical element at an incident angle corresponding to the sixth angle, in the waveguide medium.

A process in which the polarization conversion element having the configurations as above generates one polarized light from incident light of unpolarized light will be described with reference to FIG. 2. FIG. 2 is a diagram schematically showing a polarization conversion element comprising the third holographic optical element according to one aspect of the present application. The polarization conversion element in the diagram comprises the first holographic optical element (100), the second holographic optical element (200), the third holographic optical element (300), the waveguide medium (400) and the retarder (500) formed on the sidewall of the waveguide medium (400), where the traveling path of light in the diagram is indicated by arrows. In the diagram, it is assumed that a $\lambda/4$ plate is used as the retarder and the incident light is composed of two linearly polarized lights having polarization directions orthogonal to each other. In the diagram, the first polarized light is represented by S, the second polarized light by P, and the incident light (unpolarized light) by L.

As in the diagram, the incident light (L) enters the first holographic optical element (100) at the first angle. In the diagram, the first angle is about 0 degrees. The incident light (L) incident in this manner is refracted by the first holographic optical element and exited to the second angle (about 45 degrees in the diagram). The exited light is incident on the second holographic optical element (200) at the third angle (about 45 degrees in the diagram), the first polarized light (S) is incident on the waveguide medium (400) at an output angle of about −45 degrees, which is the fourth angle, and the second polarized light (P) is incident on the waveguide medium (400) at the output angle of about 45 degrees, which is the fifth angle. The first polarized light (S) incident in this manner is again incident on the third holographic optical element (300) at about 0 degrees, which is the sixth angle and finally exited to the output angle of about 45 degrees and discharged to the outside of the waveguide medium. Although the diagram has shown the case where the first polarized light (S) has been incident directly on the third holographic optical element (300) without being incident on the sidewall comprising the retarder (500), the first polarized light (S) may be incident on the third holographic optical element (300) after being incident on the sidewall, on which the retarder (500) is formed, even times and totally reflected, as described above. On the other hand, the second polarized light (P) is incident on the sidewall provided with the retarder (500), and since the second polarized light (P) is reflected by this sidewall, the delay value that the second polarized light (P) is substantially delayed by the retarder (500) becomes $\lambda/2$. Therefore, when the second polarized light (P) is totally reflected and exited, it becomes a linearly polarized light having the same polarization direction as the first polarized light (S), and the totally reflected light thus converted into the first polarized light (S) enters the third holographic optical element (300) and is discharged after refraction in the same manner as the first polarized light (S). Although the diagram has shown the case where the second polarized light (P) has been incident on the sidewall comprising the retarder (500) once, the second polarized light (P) may be incident on the third holographic optical element (300) after being incident on the sidewall, on which the retarder (500) is formed, odd times and totally reflected, as described above.

Through such a process, the unpolarized light (L) incident at first can all be converted into the first polarized light (S) and discharged, as confirmed in the diagram.

The light exit surface of the waveguide medium in the polarization conversion element according to another aspect of the present application may be formed into a shape capable of refracting and exiting the incident light.

On the other hand, the shape of the light exit surface in the waveguide medium is not particularly limited, which can be formed, for example, such that the light incident on the light exit surface can be exited to an output angle of greater than about −90 degrees and less than 90 degrees based on the normal of the light entrance surface in the waveguide medium. The output angle may be −80 degrees or more, −70 degrees or more, −60 degrees or more, −50 degrees or more, −40 degrees or more, −30 degrees or more, −20 degrees or more, −10 degrees or more, or −5 degrees or more, and in other examples, it may be 80 degrees or less, 70 degrees or less, 60 degrees or less, 50 degrees or less, 40 degrees or less, 30 degrees or less, 20 degrees or less, 10 degrees or less, or 5 degrees or less, and may be substantially 0 degrees.

Such a shape is variously known in the art, and for example, a prism shape or a lenticular lens shape can be applied.

In this case, the waveguide medium can be formed such that the first polarized light not incident on the sidewall, on which the retarder is formed, or the first polarized light incident on the sidewall, on which the retarder is formed, even times, can enter the light exit surface of the waveguide medium, and the second polarized light incident on the sidewall, on which the retarder is formed, odd times, can be incident on the light exit surface of the waveguide medium.

A process in which the polarization conversion element having the configurations as above generates one polarized light from incident light of unpolarized light will be described with reference to FIG. 3. FIG. 3 is an example of the case where the above-mentioned shape (401) exists on the light exit surface of the waveguide medium according to one aspect of the present application. The polarization conversion element in the diagram comprises the first holographic optical element (100), the second holographic optical element (200), the waveguide medium (400) having a refractive shape (401) on the light exit surface, and the retarder (500) formed on the sidewall of the waveguide medium (400), where the traveling path of light in the diagram is indicated by arrows. In the diagram, it is assumed that a $\lambda/4$ plate is used as the retarder (500) and the incident light is composed of two linearly polarized lights having polarization directions orthogonal to each other. In the diagram, the first polarized light is represented by S, the second polarized light by P, and the incident light (unpolarized light) by L.

As in the diagram, the incident light (L) enters the first holographic optical element (100) at the first angle. In the diagram, it is the first angle (about 0 degrees). The incident light (L) incident in this manner is refracted by the first holographic optical element and exited to the second angle (about 45 degrees in the diagram). The exited light is incident on the second holographic optical element (200) at the third angle (about 45 degrees in the diagram), the first polarized light (S) is incident on the waveguide medium (400) at an output angle of about −45 degrees, which is the fourth angle, and the second polarized light (P) is incident on the waveguide medium (400) at the output angle of about 45 degrees, which is the fifth angle. The first polarized light (S) incident in this manner is guided under a state of not incident on the sidewall of the waveguide medium (400), on which the retarder (500) is formed, and is incident on the light exit surface having the refractive shape (401) formed thereon and is discharged after refraction. Although the diagram has shown the case where the first polarized light (S) has been incident on the output surface without being incident on the sidewall comprising the retarder (500), the first polarized light (S) may be incident on the output surface after being incident on the sidewall, on which the retarder (500) is formed, even times and totally reflected, as described above. On the other hand, the second polarized light (P) is incident on the sidewall provided with the retarder (500), and since the second polarized light (P) is reflected by this sidewall, the delay value that the second polarized light (P) is substantially delayed by the retarder (500) becomes $\lambda/2$. Therefore, when the second polarized light (S) is totally reflected and exited, it becomes a linearly polarized light having the same polarization direction as the first polarized light (S), and the totally reflected light thus converted into the first polarized light (S) enters the output surface and is discharged after refraction in the same manner as the first polarized light (S). Although the diagram has shown the case where the second polarized light (P) has been incident on the sidewall comprising the retarder (500) once, the second polarized light (P) may be incident on the output surface after being incident on the sidewall, on which the retarder (500) is formed, odd times and totally reflected, as described above.

Through such a process, the unpolarized light (L) incident at first can all be converted into the first polarized light (S) and discharged, as confirmed in the diagram.

In the present application, the types of each holographic optical element, waveguide medium, retarder, and the like used for realizing the above structure are not particularly limited. In the field of optics, components that represent the same actions as the respective holographic optical elements, waveguide medium, retarder, and the like are variously known and all of these components can be used in the present application.

The present application also relates to an optical isolation device. The term optical isolation device may mean a device configured such that the transmittance of light incident in either direction is relatively greater than the transmittance of light incident in the opposite direction. In the optical isolation device, the direction having a large transmittance of incident light can be referred to as a forward direction, and the opposite direction can be referred to as a backward direction. Here, the forward direction and the backward direction may form an angle of approximate 160 degrees to 200 degrees with each other, but is not limited thereto.

In the optical isolation device, the ratio of the transmittance of the light incident in the forward direction and the transmittance of the light incident in the backward direction can be about 3 dB or more, by the isolation ratio (IR) depending on Equation 1 below. In another example, the isolation ratio may be about 3.5 dB or more, 4 dB or more, or 4.5 dB or more. The upper limit of the isolation ratio is not particularly limited because it shows that the higher the numerical value is, the better the optical isolation effect. In one example, the isolation ratio may be about 10 dB or less, about 9.5 dB or less, about 9 dB or less, about 8.5 dB or less, about 8 dB or less, about 7.5 dB or less, about 7 dB or less, about 6.5 dB or less, or about 6 dB or less.

$$IR = 10 \times n \times \log(F/B) \quad \text{[Equation 1]}$$

In Equation 1, IR is an isolation ratio, n is a number of optical isolation elements, which are described below, included in the optical isolation device, F is a transmittance of light incident on the optical isolation device in the forward direction, and B is a transmittance of light incident on the optical isolation device in the backward direction.

The transmittance of light incident in the forward direction of the optical isolation device may be about 10% or more, about 15% or more, about 20% or more, about 25% or more, about 30% or more, about 35% or more, about 40% or more, about 45% or more, about 50% or more, about 55% or more, about 60% or more, about 65% or more, about 70% or more, about 75% or more, about 80% or more, about 85% or more, about 90% or more, or about 95% or more. The upper limit of the forward transmittance may be about 100%. Also, the transmittance of light incident in the backward direction of the optical isolation device may be less than about 50%, about 45% or less, about 40% or less, about 35% or less, about 30% or less, about 25% or less, about 20% or less, about 15% or less, about 10% or less, or about 5% or less. The lower limit of the backward transmittance may be about 0%.

The optical isolation device may comprise at least one or more optical isolation elements. The term optical isolation element is a unit element forming an optical isolation device, which has an optical isolation function alone. Accordingly, the optical isolation element is also configured such that the transmittance of the light incident in the forward direction is relatively larger than the transmittance of the light incident in the backward direction, where the range of the isolation ratio, forward transmittance and backward transmittance can be applied equally by the contents mentioned in the optical isolation device.

The optical isolation element may comprise the polarization conversion element and the polarizer. As schematically shown in FIG. 4, the polarization conversion element (201) and the polarizer (202) may be located such that light incident on the side of the polarization conversion element (201) can be transmitted through the element (201) and then face to the polarizer (202). In this specification, the direction facing from the polarization conversion element (201) to the polarizer (202) may be referred to as the forward direction (FU), and the direction toward the polarizer (202) and the polarization conversion element (201) may be referred to as the backward direction (ID).

As described above, the polarization conversion element is configured such that it can convert unpolarized light incident in a first direction into linearly polarized light and exit it to a second direction. That is, referring to the description of the polarization conversion element, the first and second directions may be parallel to the direction in which unpolarized light is incident on the first holographic optical element. Here, the linearly polarized light exited in the second direction may be one linearly polarized light. That is, the linearly polarized light exited to the second direction may not comprise two or more linearly polarized lights having different polarization directions from each other. The first and second directions may be directions approximately parallel to the forward direction.

The optical isolation element comprises a polarizer together with the above-described polarization conversion element, where the polarizer is disposed at a position where the linearly polarized light traveling in a forward direction and transmitted through the optical isolation element can enter. As the polarizer, for example, an absorbing linear polarizer can be used. The absorbing linear polarizers are variously known in the art and, for example, so-called PVA (poly(vinyl alcohol)) polarizers can be used. This absorbing polarizer has a transmission axis formed in one direction and an absorption axis formed in a direction perpendicular to the transmission axis, where the polarizer may be disposed such that the transmission axis is parallel to the polarization direction of the linearly polarized light generated by being transmitted through the polarization conversion element. In such a case, the light that is incident in the forward direction and is transmitted through the polarization conversion element can theoretically be transmitted 100%, and at least 50% of the light transmitted in the backward direction is absorbed and blocked by the absorbing linear polarizer.

The optical isolation element may further comprise a phase delay plate. Here, the phase delay plate is an optical element having the same concept as the above-described retarder, but in the present application, it is referred to as a phase delay plate in order to distinguish it from the retarder included in the polarization conversion element. The phase delay plate may be located at a position where light traveling in a forward direction enters after being transmitted through the polarizer. Such a phase delay plate can solve a problem that may occur as the light once transmitted through the optical isolation element in the forward direction travels toward the optical isolation element again by reflection or the like. That is, the light reflected due to the presence of the phase delay plate will be converted into linearly polarized light parallel to the absorption axis of the absorbing polarizer, thereby being absorbed back to the polarizer.

In this case, the above-described λ/4 plate may be used as the phase delay plate. The specific types of the λ/4 plate are as described above.

In this case, the phase delay plate may be disposed such that its optical axis (e.g., slow axis) forms an angle in a range of about 40 degrees to 50 degrees, for example, about 45 degrees, or in a range of 130 degrees to 140 degrees, for example, about 135 degrees, with the transmission axis of the absorbing polarizer.

The optical isolation element may further comprise, if necessary, a light-path controller, such as a prism or a reflective plate, which can additionally control the light path, in addition to those included in the above-described polarization conversion element.

In addition, the optical isolation element may comprise additional optical components other than the above if necessary. For example, the optical isolation element may comprise an optical component, such as the following louver plate.

Such a louver plate or the like may exist, for example, behind the side where the light traveling in the forward direction is finally exited, for example, the polarizer or the phase delay plate as described above.

The optical isolation device may comprise one or two or more optical isolation elements as above. When two or more optical isolation elements are included, each of the optical isolation elements may be disposed so that the light transmitted through any one optical isolation element along the forward direction may enter the side of the polarization conversion element of the other optical isolation element. By applying a plurality of optical isolation elements as above, the optical isolation ratio can be more improved. For example, referring to FIG. 5, theoretically, light transmitted through a number of optical isolation elements in the forward direction continues to be transmitted without loss, but in the case of light transmitted in the backward direction, it continues to be reduced by an exponent of ½. Therefore, by controlling the number of the optical isolation elements, it is possible to maximize the optical isolation ratio.

Advantageous Effects

The present application provides a polarization conversion element capable of converting unpolarized incident light into one polarized light and an optical isolation device with an excellent optical isolation ratio comprising the polarization conversion element. Such an optical isolation device can be applied to various applications such as the field of optical communication or laser optics, the field of security or privacy protection, brightness enhancement of displays, or a use for hiding and covering.

BRIEF DESCRIPTION OF DRAWINGS

FIG. 1 is a diagram schematically showing a Faraday optical isolator.

FIGS. 2 and 3 are schematic diagrams of polarization conversion elements of the present application.

FIG. 4 is a diagram showing a basic configuration of an optical isolation element of the present application.

FIG. 5 is a diagram schematically showing a case where a number of optical isolation elements are included.

MODE FOR INVENTION

Hereinafter, the present application will be described in detail with reference to the following examples and comparative examples, but the scope of the present application is not limited to the following examples.

Example 1

After manufacturing an element having the structure as shown in FIG. 2, a Genesis MX SLM laser from Coherent was entered into the relevant element (power 10 mW) to test the element. The holographic optical elements (100, 200, and 300 in FIG. 2) used in manufacturing the element were all transmissive elements, where elements manufactured in a known manner were used. That is, the holographic optical element was manufactured with a laser power of about 200 mW in an interferometer using the Genesis MX SLM laser from Coherent with a wavelength of 532 nm as a light source to a photopolymer having a thickness of about 5 μm to 30 μm. The photopolymer had a refractive index before exposure of about 1.5 and a refractive index difference in interference patterns of about 0.03 after exposure.

The first optical element (100 in FIG. 2) and the third optical element (300 in FIG. 2) were transmissive holographic optical elements that were exited to an output angle of 45 degrees when light was incident at an incident angle of 0 degrees, and the second optical element (200 in FIG. 2) was an element that among unpolarized light incident at an incident angle of about 45 degrees, the first polarized light (S) was exited to an angle of about −45 degrees and the second polarized light (P) was transmitted as such.

The waveguide medium (400) was constructed using a prism (refractive index: about 1.5) of a cubic shape having a length of about 2 cm on one side, the same shape as FIG. 2 was constructed by cutting the prism and introducing the third optical element (300) into the cut surface, and a λ/4 plate for the wavelength of the laser to be irradiated was formed on the side surface.

The ratio (T1/T2) of the forward transmittance (T1) obtained by irradiating the element having the above shape with light as shown in FIG. 2 (forward irradiation) and the backward transmittance (T2) determined by transmitting light in the opposite direction was about 3.23, and the ratio of the first polarized light among the lights transmitted in the forward direction was about 76.2%.

Also, the isolation ratio (IR) determined for the element was about 5.1 dB.

The invention claimed is:

1. A polarization conversion element for converting unpolarized incident light comprising first and second polarized lights, which are an orthogonal mode pair to each other, into one polarized light and exiting it,
   wherein the polarization conversion element comprises a first holographic optical element, a second holographic optical element and a waveguide medium in this order, where a light entrance surface and a light exit surface are each formed thereon,
   the first holographic optical element is an optical element capable of exiting the unpolarized incident light incident on the light entrance surface at an incident angle of a first angle which is an angle of greater than −90 degrees and less than 90 degrees, to an output angle which differs from the first angle and is a second angle in a range of greater than 0 degrees and less than 90 degrees or in a range of greater than −90 degrees and less than 0 degrees,
   the second holographic optical element is an optical element that among the unpolarized light entering to an incident angle of a third angle, the first polarized light can be exited to an output angle of a fourth angle and the second polarized light can be exited to an output angle of a fifth angle which differs from the fourth angle,
   the waveguide medium comprises a sidewall provided with a retarder and is formed such that the first polarized light incident on the waveguide medium at the output angle of the fourth angle can be exited to the light exit surface without being incident on the sidewall provided with the retarder or after being incident thereon even times and totally reflected, and the second polarized light incident on the waveguide medium at the output angle of the fifth angle can be exited to the light exit surface after being incident on the sidewall provided with the retarder odd times and totally reflected,
   the sum of the second angle and the third angle is in a range of 80 degrees to 100 degrees, and
   the sum of the fourth angle and the fifth angle is in a range of −10 degrees to 10 degrees.

2. The polarization conversion element according to claim 1, wherein the third to fifth angles are each in a range of greater than 0 degrees and less than 90 degrees, or in a range of greater than −90 degrees and less than 0 degrees.

3. The polarization conversion element according to claim 1, wherein the retarder is a λ/4 plate.

4. The polarization conversion element according to claim 1, further comprising a third holographic optical element having a light exit surface and a light entrance surface, wherein the third holographic optical element is located inside the waveguide medium.

5. The polarization conversion element according to claim 4, wherein the third holographic optical element is an optical element capable of exiting the light incident at an incident angle of a sixth angle in a range of greater than −90 degrees and less than 90 degrees to an output angle which is a seventh angle of greater than 0 degrees and less than 90 degrees or greater than −90 degrees and less than 0 degrees, and the sum of the seventh angle and the second angle which is an output angle of the first holographic optical element is in a range of 80 degrees to 100 degrees.

6. The polarization conversion element according to claim 5, wherein the third holographic optical element is present at a position where the first polarized light not incident on the sidewall, on which the retarder is formed, or the first polarized light incident on the sidewall, on which the retarder is formed, even times, can be incident on the third holographic optical element at an incident angle corresponding to the sixth angle, and the second polarized light incident on the sidewall, on which the retarder is formed, odd times, can be incident on the third holographic optical element at an incident angle corresponding to the sixth angle, in the waveguide medium.

7. The polarization conversion element according to claim 1, wherein on the light exit surface of the waveguide medium, a refractive shape capable of refracting and exiting light incident on the light exit surface is formed.

8. The polarization conversion element according to claim 7, wherein the waveguide medium is formed such that the first polarized light not incident on the sidewall, on which the retarder is formed, or the first polarized light incident on the sidewall, on which the retarder is formed, even times, can be incident on the light exit surface with the refractive shape, and the second polarized light incident on the sidewall, on which the retarder is formed, odd times, can be incident on the light exit surface with the refractive shape.

9. An optical isolation device comprising at least one optical isolation element,
wherein the optical isolation element comprises the polarization conversion element of claim 1 and a polarizer, which are sequentially disposed.

10. The optical isolation device according to claim 9, wherein the polarization conversion element generates one linearly polarized light.

11. The optical isolation device according to claim 10, wherein the polarizer is an absorbing linear polarizer having a transmission axis formed in one direction and an absorption axis formed in a direction perpendicular to the transmission axis, and the polarizer is disposed such that the transmission axis is formed in a direction parallel to the linearly polarized light.

12. The optical isolation device according to claim 9, further comprising a phase delay plate at a position where light generated in the polarization conversion element and transmitted through the polarizer can enter.

13. The optical isolation device according to claim 12, wherein the phase delay plate is disposed such that its slow axis forms any one angle in a range of 40 degrees to 50 degrees or any one angle in a range of 130 degrees to 140 degrees with the transmission axis of the polarizer.

14. The optical isolation device according to claim 12, wherein the phase delay plate is a λ/4 plate.

* * * * *